April 16, 1968 T. B. MARTIN, JR 3,378,710
MAGNETIC TRANSMISSION

Filed June 1, 1964 6 Sheets-Sheet 1

INVENTOR.
THOMAS B. MARTIN, JR.
BY
ATTORNEY

INVENTOR.
THOMAS B. MARTIN, JR.
BY
ATTORNEY

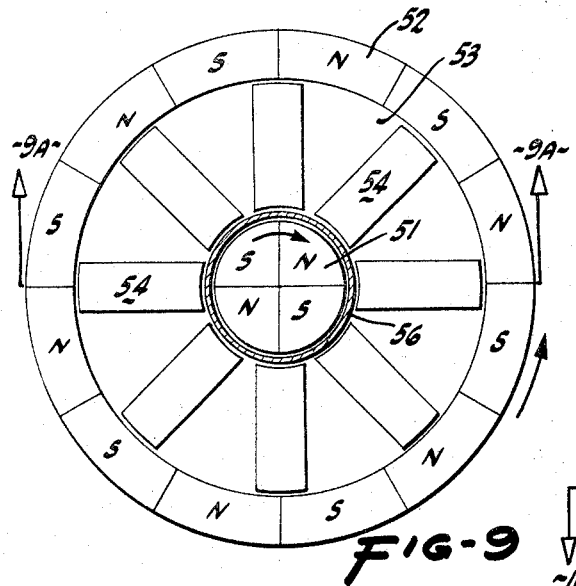
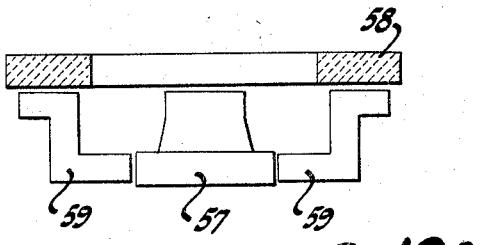
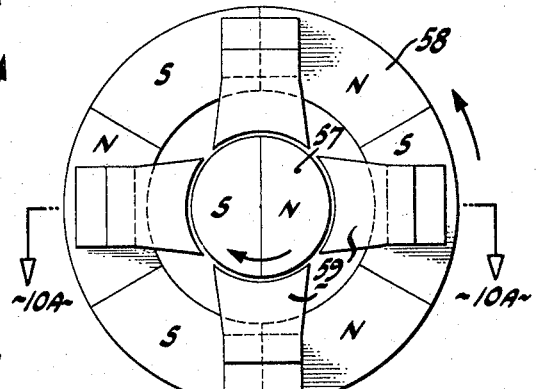
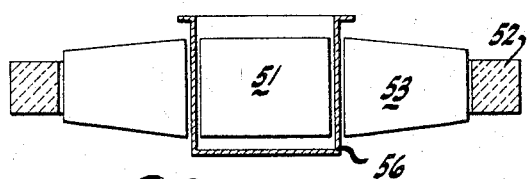
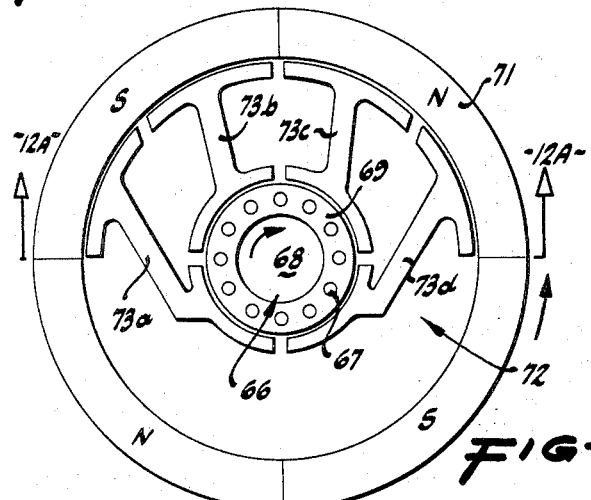
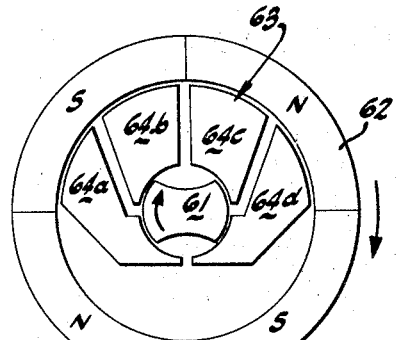
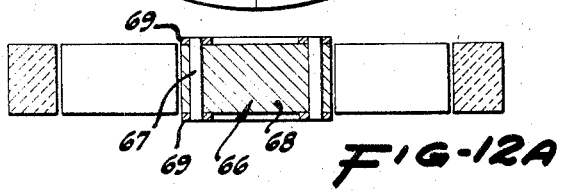

April 16, 1968 T. B. MARTIN, JR 3,378,710
MAGNETIC TRANSMISSION

Filed June 1, 1964 6 Sheets-Sheet 4

INVENTOR.
THOMAS B. MARTIN, JR.
BY
Julian Caplan
ATTORNEY

April 16, 1968 T. B. MARTIN, JR 3,378,710
MAGNETIC TRANSMISSION

Filed June 1, 1964 6 Sheets-Sheet 5

INVENTOR.
THOMAS B. MARTIN, JR.
BY
Julian Caplan
ATTORNEY

April 16, 1968

T. B. MARTIN, JR 3,378,710

MAGNETIC TRANSMISSION

Filed June 1, 1964

INVENTOR.
THOMAS B. MARTIN, JR.
BY
Julian Caplan
ATTORNEY 3,378,710
MAGNETIC TRANSMISSION
Thomas B. Martin, Jr., Danville, Calif., assignor to Micro Pump Corporation, Danville, Calif., a corporation of California
Filed June 1, 1964, Ser. No. 371,479
17 Claims. (Cl. 310—104)

ABSTRACT OF THE DISCLOSURE

A magnetic drive similar to a planetary gear mechanical drive is provided. Thre elements having a common axis of revolution are provided, namely—an outer ring magnet, an intermediate planet ring having a plurality of substantially radial magnetically permeable bars, and a sun magnet. One of the elements is power-driven and a second element is then driven. The drive may be used to achieve a speed increase or decrease.

---

This invention relates to a new and useful magnetic transmission which may be used in substitution for, and amplification of power transmissions such as gear-drives. More specifically, the present invention relates to a magnetic drive of the nature of a planetary gear drive.

Heretofore, magnetic drives or couplings have been used for various purposes. A ceramic magnet of the type wherein a ring or plate of barium carbonate with ferric oxide embedded therein has been a preferred magnetic material. A pair of such rings or plates has been positioned with the poles of the magnets in close proximity. When one of the magnets is turned, a corresponding movement of the opposite magnet is obtained. There are many advantages to such drive and a feature of the present invention is the fact that such advantages are preserved. However, the present invention differs from such prior drives in that instead of two elements in the magnetic coupling, the present invention employs three essential components. Whereas the torque output of a magnetic coupling of the types previously used is always equal to the torque input in the same direction, the addition of a third element in accordance with this invention provides a reaction member whereby the torque can be changed in direction and/or magnitude between the input and output of the drive. Corresponding changes in speeds which are inversely proportionate to the changes in torque are produced.

Accordingly, a principal feature of the present invention is the fact that it may be used in a magnetic drive to achieve a speed increase (although it can be used also to achieve a speed decrease, if required). An important adaptation of this feature of the invention is in the drive for centrifugal pumps. Heretofore, it has not been possible to provide a motor drive that has the mechanical simplicity, reliability and long-life due to freedom from wear of the ordinary A.C. induction motor, above the synchronous speed of 3,600 r.p.m. for ordinary 60-cycle A.C. electrical power, which is the standard almost everywhere throughout the United States. Thus, the speed of the driven member is limted to one revolution per cycle of the A.C. power source. Only by resorting to special high frequency sources of electrical power, such as the 400 cycles per second power used in aircraft, may induction motors be operated at higher speeds. The present invention provides a means for increasing the speed of the output of an induction motor while maintaining the simplicity, reliability and long-life of an induction motor in the unit as a whole.

In application to pumps, heretofore, direct drive centrifugal pumps have been limited to low pressure installation because the pressure rise in the pump is determined by the peripheral velocity of the pump impeller and when the pump impeller was made small, the peripheral velocity of the impeller was correspondingly reduced and the rotational speed cannot be increased to make up for the reduced peripheral speed without unsatisfactory expedients, such as belt drives. Accordingly, the present invention provides a means for using a conventional, 60-cycle induction motor and by speeding up the magnetic drive between the motor shaft and the pump shaft to drive the pump at a higher rotational speed than the motor. A centrifugal pump coupled to an A.C. induction motor has mechanical simplicity and freedom from wear, and such advantages are retained in accordance with the present invention, yet the shaft r.p.m. of the pump is increased beyond that of the motor.

A feature of a magnetic drive is the fact that the pump may be sealed without the use of complicated rotary seals which are conventionally used on centrifugal pumps. Thus, a membrane is interposed between the two magnets of the magnetic drive, said membrane having no openings for the drive shaft and hence requiring no shaft seal. This is one of the principal advantages of magnetic drives in the pump art. The present invention preserves this feature of the invention and makes it possible to achieve a seal without using a shaft seal of the conventional type.

An important feature of this invention is the provision of the drive between a driving member and a driven member wherein torque and speed ratios other than 1-to-1 can be transmitted without mechanical contact. The reacting members of the three elements of the drive can be isolated from each other by solid membranes, if desired.

As has previously been mentioned, besides using the present invention to achieve a speed increase, the device may be used also for speed reduction purposes. Thus, high speed prime movers, such as turbine wheels, may be used to drive driven members at reduced speeds. This is achieved without mechanical contact and the problems of wear and friction of traditional gear reduction means are eliminated.

In essence, the present invention provides a drive member comprising a ceramic magnet, preferably of the annular ring-type, a similar ceramic magnet of a different diameter mounted concentric and substantially coplanar with the first-mentioned magnet which may be the driven member, and a third element interposed between the two magnets, which comprises a reaction member or field structure which comprises a plurality of magnetically permeable bars extending substantially radially with respect to the concentric axis of the two magnets. The number of bars in the intermediate member and the number of poles in each of the magnets is subject to variation. By variation in these numbers, and certain variations in the arrangements of the bars in the field structure, speed ratio and direction of rotation may be varied.

Although permanent magnets are illustrated and specifically described herein, nevertheless, electro-magnets may be substituted for any or all magnetized members herein.

In essence, the present invention may be likened to a planetary gear system wherein the drive magnet is the sun gear, the driven magnet is the ring gear, and the bars of the field structure are the planets. However, the present invention possesses a great versatility which has never heretofore been achieved in planetary gear drives, all as hereinafter described in detail.

Other objects of the present invention will become apparent upon reading the following specification and referring to the accompanying drawings in which similar characters of reference represent corresponding parts in each of the several views.

FIGS. 3–8 inclusive are similar schematic views hereinafter described in detail showing variations in direction and speed ratio achieved by different arrangements of poles of the magnets and of the bars of the field structure.

FIG. 9 is a further schematic view showing a membrane interposed about the inner magnet.

FIG. 9A is a transverse sectional view taken substantially along the line 9a—9a of FIG. 9.

FIG. 10 is a schematic view of a further modification using a face magnet for one of the armatures.

FIG. 10A is a transverse sectional view taken substantially along the line 10a—10a of FIG. 10.

FIG. 11 is a schematic view showing a drive having an unmagnetized salient pole armature.

FIG. 12 is a schematic end elevation of a squirrel cage armature substituted for an unmagnetized armature.

FIG. 12A is a transverse sectional view taken substantially along the line 12a—12a of FIG. 12.

Figure 13:
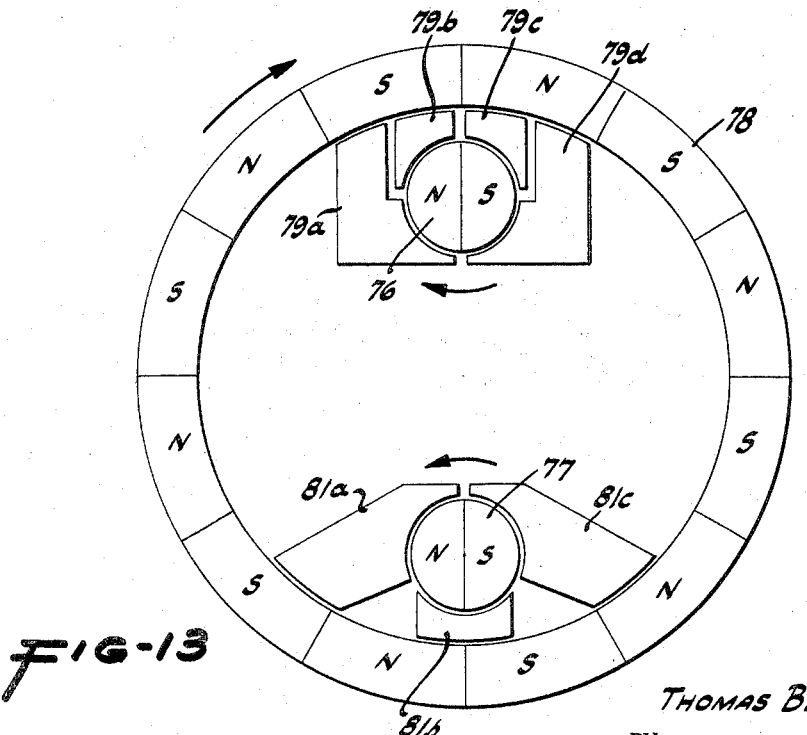

FIG. 13 is a schematic end elevation showing how two armatures may be driven from a common armature through an appropriate field structure.

Figure 14:
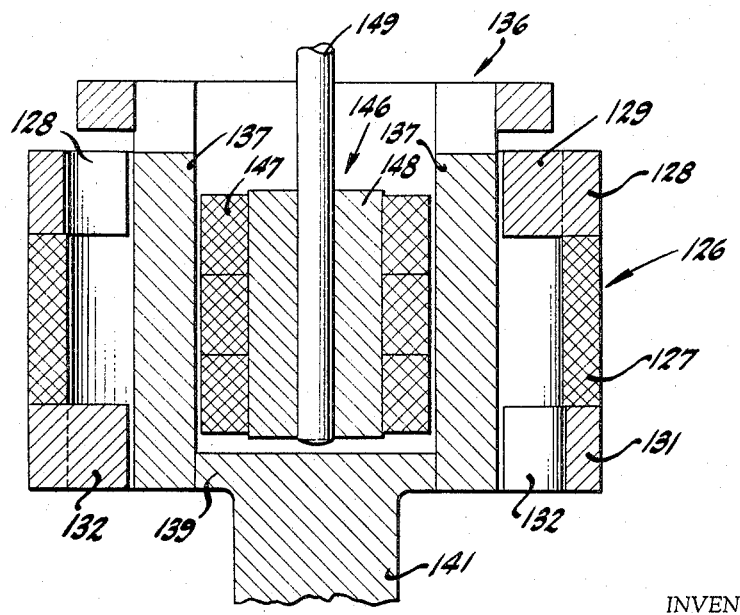

FIG. 14 is a fragmentary vertical sectional view of a further modified structure.

Figure 15:
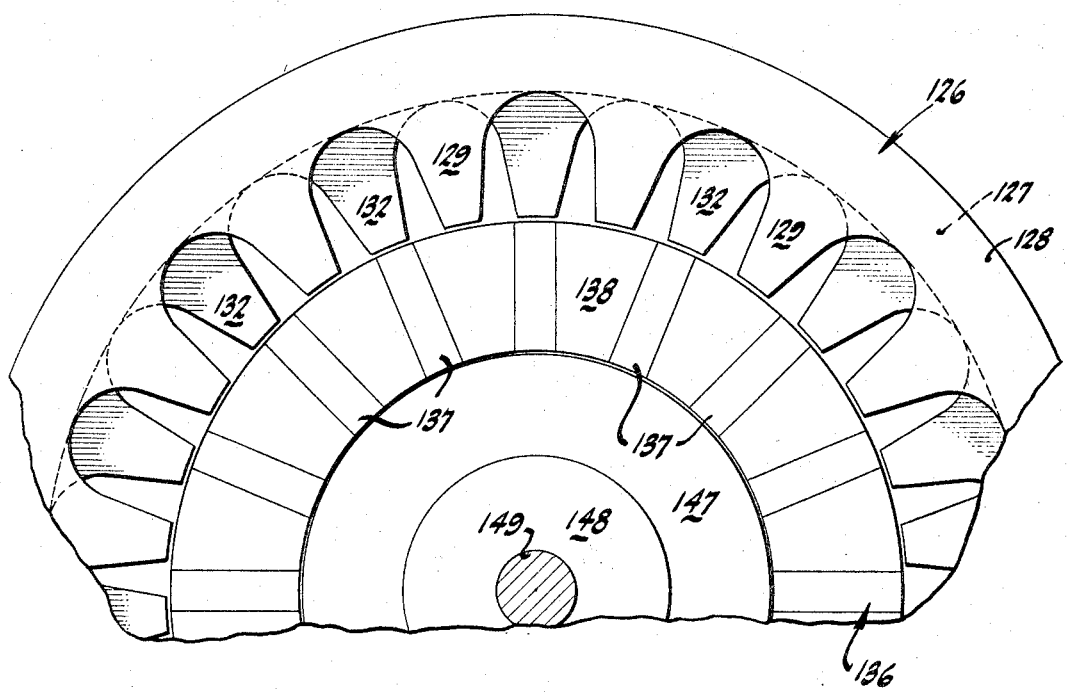

FIG. 15 is a fragmentary, enlarged end elevation of a portion of the structure of FIG. 14.

Figure 16:
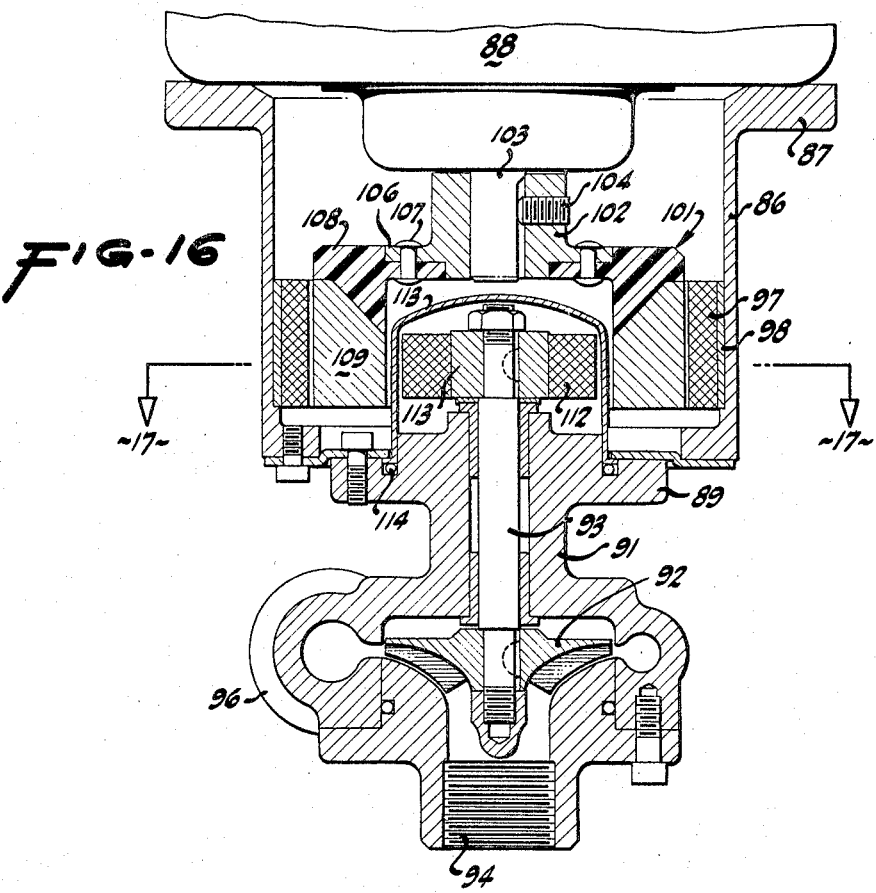

FIG. 16 is a transverse sectional view through the magnetic drive and a portion of a centrifugal pump illustrating a practical embodiment of the present invention.

Figure 17:
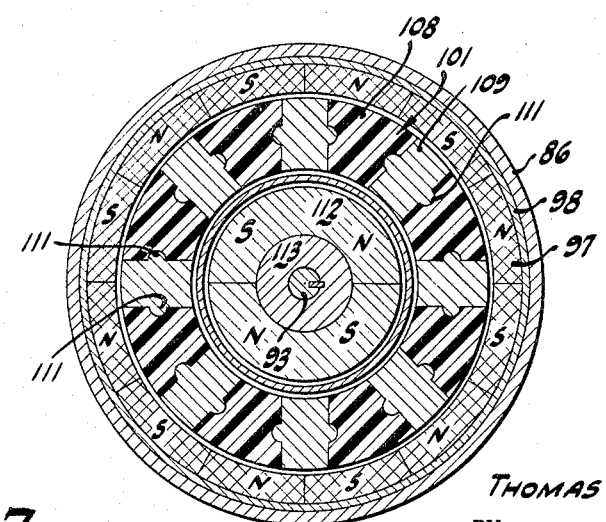

FIG. 17 is a transverse sectional view taken substantially along line 17—17 of FIG. 16.

Figure 18:
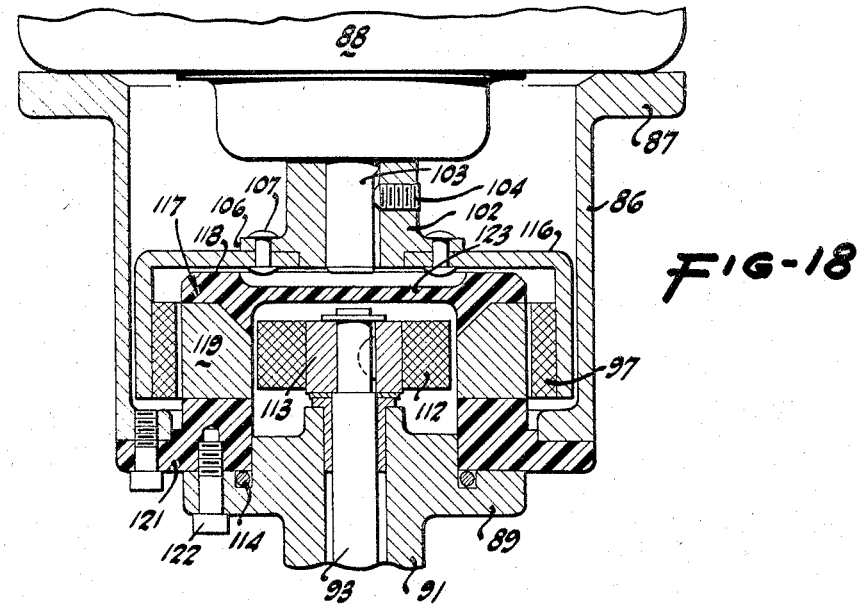

FIG. 18 is a view similar to FIG. 16, showing a modified construction.

In the various modifications of the invention hereinafter described in detail, two of the driving members are magnets and at least one of such magnets may be a so-called ceramic magnet wherein a material such as barium carbonate has incorporated therein a considerable mass of magnet material, such as iron oxide. Such a magnet is produced by Stackpole Carbon Company under the trademark Cera Magnet. It is a characteristic of such a magnet that a plurality of poles may be substantially, permanently, magnetically induced therein. The magnet has an extreme resistance to demagnetization and high electrical resistivity. Eddy current losses are negligible. The number of poles per magnet is subject to wide variation as is hereinafter illustrated in detail. Thus, there may be one north pole and one south pole in each magnet, or there may be a large number of poles in each magnet, such as twelve or more north poles, and a corresponding number of south poles. The shape of a magnet is also subject to considerable variation. Basically, there are two types, namely, an annular ring and a disc or face plate. Usually a pair of rings is mounted about a concentric common axis. Alternatively, the face plates are opposed and parallel. However, as shown particularly in FIG. 10, a ring and a face plate magnet may be used simultaneously.

Interposed between the two magnets is a field structure which transmits magnetism from one end of the magnetically permeable rods or pole pieces therein to the opposite end.

Figure 1A:
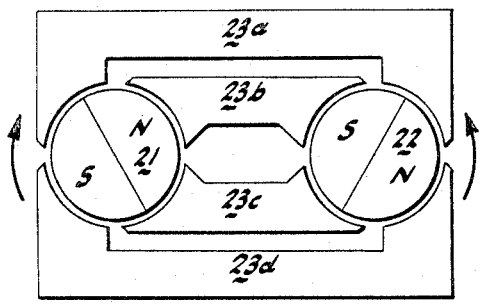
FIG. 1A is a schematic view showing the bare essentials of a 1-to-1 drive of the present invention, wherein the direction of rotation is reversed.
Figure 1B:
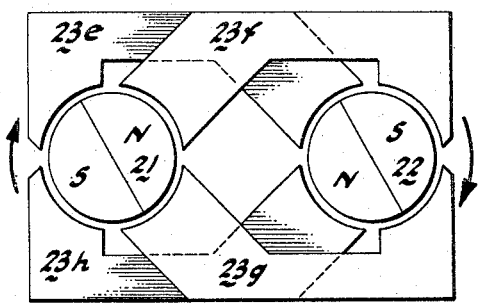
FIG. 1B is a view similar to FIG. 1, but showing a reversal of direction of rotation as compared with FIG. 1A.
Figure 1C:
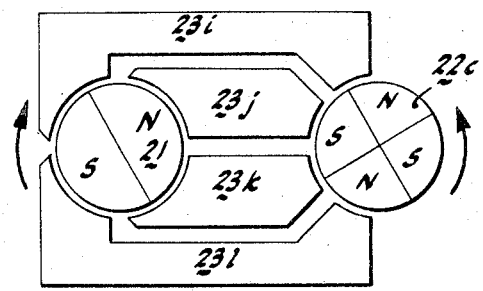
FIG. 1C is still another modification showing a variation in speed ratio.

The most elementary forms of the invention are shown schematically in FIGS. 1A to 1C, inclusive. In FIG. 1A there is a magnetized armature 21 having one south and one north pole, as indicated in the drawing, and there is provided means for rotation forming no part of the invention and not being herein illustrated but for practical purposes such rotation may be accomplished by means of an electric induction motor. A second armature 22 is mounted adjacent armature 21 likewise having one north and one south pole. Intermediate the two armatures are four magnetically permeable pole pieces, 23a, 23b, 23c, 23d. The pole pieces 23 provide magnetic paths between the appropriate poles of the two armatures 21, 22. As armature 21 is rotated, the polarity of the various ends of the pole pieces 23a–23d changes as the north and the south poles of magnet 21 approach the same, and as is well understood in the art of magnetism, the opposite ends of the pole pieces are oppositely, magnetically affected. In the structure of FIG. 1A, by reason of rotation of armature 21 in a clockwise direction, and by reason of the fact that there are the same number of poles in each of the two armatures 21, 22, armature 22 is caused to rotate at the same speed as armature 21, but in an opposite direction. A north pole of armature 21 is approaching a particular segment of the field structure at the same time a south pole of armature 22 is approaching the same segment, and this accounts for the rotation of the two armatures as indicated. It will be understood that instead of there being only a single south pole on each armature, the number of north poles may be increased to any convenient number and a corresponding number of south poles provided.

FIG. 1B shows similar armatures 21 and 22, but in this case the pole pieces, 23e, 23f, 23g, 23h, cross over and thus the direction of rotation of armature 22 is the same as armature 21 or opposite that of the corresponding armature of FIG. 1A.

FIG. 1C shows still another modification of a basic system. Armature 21 is essentially the same as in the preceding modification. However, armature 22c has two north and two south poles. The pole pieces 23i, 23j, 23k, and 23l are arranged so that their lefthand ends are essentially the same as in 23a, but their righthand ends are all to one side of a diameter through the axis of armature 23c. This arrangement of the parts results in a speed of armature 22c which is one-half that of armature 21, but the direction of rotation is the same as armature 22 in FIG. 1A (and opposite that of armature 21). In these arrangements, the differences in torque between the input and the output armature shafts are supplied via the field structure 23 in each case.

Figure 2:
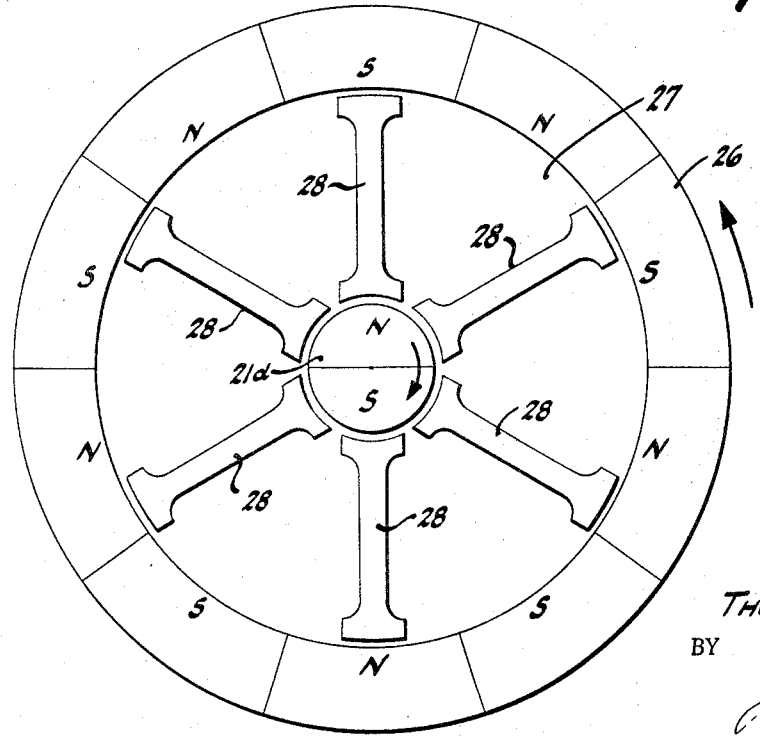
FIG. 2 is a schematic view showing the invention adapted to a planetary drive of a more conventional arrangement than in FIGS. 1A–1C.

Turning now to a more practical adaptation of the invention, as shown in FIG. 2, armature 21d has a single north and a single south pole and is centrally located, and is rotated by means not herein illustrated. An outer ring magnet 26 has five north poles and five south poles and functions in effect as a ring gear. The field structure 27 has fixed radially-directed, magnetically-permeable bars 28, having curved ends so that they are in close proximity to armatures 21d and 26 at the opposite ends, and these bars function as planets disposed in the annular space between the sun and the ring. There are slight air gaps at either end of bars 28 which provide clearance for the armatures to move without interference. In operation, the three parts are constrained by their magnetic fields which flow in the magnetic paths of the field structure to move with respect to each other and with respect to the field structure just as the parts of a planetary gear system would move. This is referred to as "gearwise" planetary drive rotation. The formula for the relationship of the ring, planets and sun is respectively, as follows:

$$5n_1 - 6n_2 + n_3 = 0$$

wherein $n_1$ is the revolutions per minute of the outer member, $n_2$ of the field structure, and $n_3$ of the inner member.

The same system of notation as in the preceding equation will be used with respect to the forms hereinafter illustrated. The rotation of the various parts is "gearwise"; in other words, the same as if a conventional planetary gear were to be used.

Figure 3:
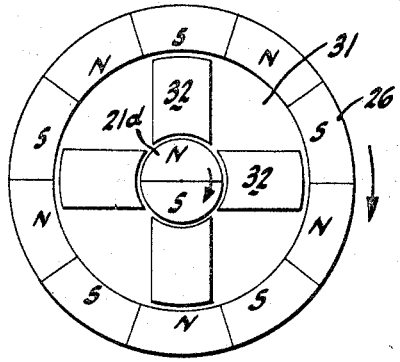

Turning now to FIG. 3, the armatures 21d and 26 are the same as in FIG. 2, but the field structure 31 is different, there being but four radial bars 32. By inspection it will be seen that the direction of rotation of the parts is opposite that shown in FIG. 2, or this is termed an "anti-gearwise" planetary drive. The formula for this drive is as follows:

$$5n_1 - 4n_2 - n_3 = 0$$

In FIGS. 2 and 3, the field structure comprises essentially radially-directed bars 28, or 32. In the form of the invention shown in FIG. 4, however, armature 21d is the same as in FIGS. 2 and 3 and armature 26 is the same as in FIG. 3. However, the field structure 33 differs from the preceding modification in that the pole pieces 34 are not radially arranged. This arrangement is gearwise and its formula is the same as FIG. 2, namely:

$$5n_1 - 6n_2 + n_3 = 0$$

It will be noted that the angle between the closer pole pieces 34 is about 54°, and in practical effect the field structure resembles that of FIG. 2 with two-pole pieces 28 removed and the remaining pieces 34 slightly adjusted in position.

Figure 4:
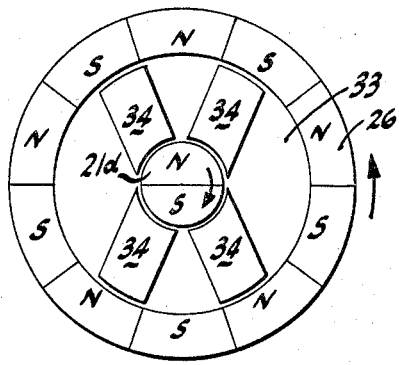
Figure 5:
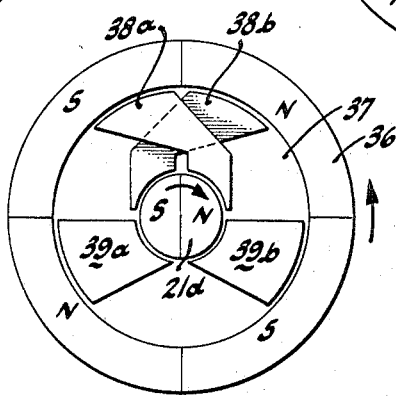

FIG. 5 shows a central armature 21d similar to FIGS. 2 to 4, inclusive, and an external armature 36 having two north and two south poles. The field structure 37 is quite different, however, in that the two upper pole pieces 38a, 38b, cross over the terminate 45° apart with respect to each other, while the bottom pole pieces 39a, 39b extend out approximately 135° apart. The direction of rotation in this arrangement is gearwise and the formula is as follows:

$$2n_1 - 3n_2 + n_3 = 0$$

Figure 6:
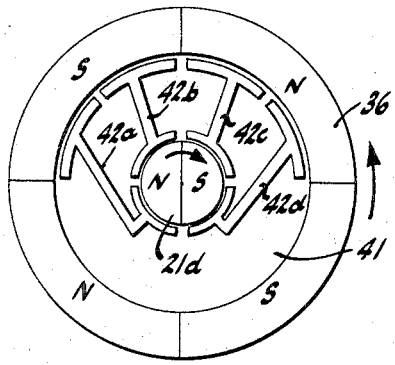

FIG. 6 shows still another arrangement of the various parts. Thus, armature 21d is essentially the same as the preceding modifications and armature 36 is the same as in FIG. 5. However, the field structure 41 is quite different. Pole piece 42a is in the second quadrant as viewed in FIG. 6, centered at 157½°. The other pole pieces 42b to 42d are centered 45° apart. The direction of rotation for this arrangement is gearwise and the formula is written as follows:

$$2n_1 - n_2 - n_3 = 0$$

Figure 7:
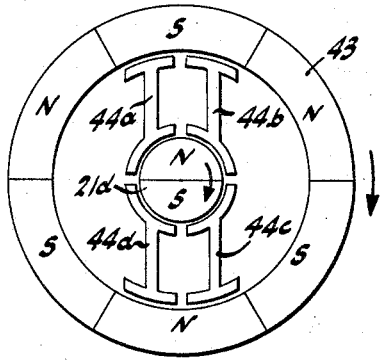

FIG. 7 has inner armatures 21d similar to the preceding modification but the outer armature 43 has three north and three south poles. The pole pieces 44a–d are arranged as illustrated in the drawings. The direction of the rotation is anti-gearwise and the formula for this arrangement is as follows:

$$3n_1 - 2n_2 - n_3 = 0$$

Figure 8:
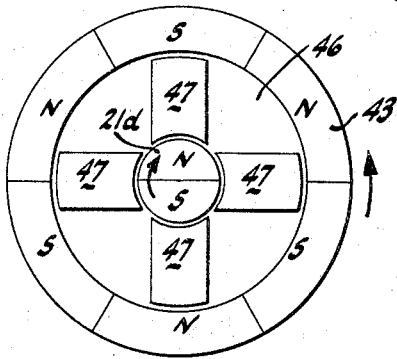

Further, in FIG. 8, an inner armature 21d is as in the preceding modification and outer armature 43 as in FIG. 7. In the field structure 46, the pole pieces 47 are four in number and radially-disposed. Accordingly, the direction of rotation is gearwise and the formula is written:

$$3n_1 - 4n_2 + n_3 = 0$$

Turning now to FIG. 9, armature 51 has two north and two south poles. Outer armature 52 has six north and six south poles. The intermediate field structure 53 has eight substantially radially-disposed bars 54. Interposed between the inner ends of bars 54 and central armature 51 is a cup-shaped membrane 56, in effect sealing off armature 51 from the surrounding structure. Partition 56 isolates the inner armature 51 in order to preserve a pressure differential of a pump without the use of a rotary pump seal. It will be understood that any of the three members 51, 52, 53, could be so isolated. The direction of rotation of FIG. 9 is gearwise and the formula is as follows:

$$3n_1 - 4n_2 + n_3 = 0$$

In FIG. 10, the central armature 57 has one north and one south pole. The outer armature 58, instead of being annular with the poles inwardly directed, is annular in the sense of being a face plate with the poles spaced around one face of the plate. There are three north and three south poles in this embodiment of the invention. The field structure 59 has four pole pieces which are angularly offset as shown in the drawings to intercommunicate between the annular central armature 57 and the face plate armature 58. The direction of rotation is gearwise and the formula is expressed as follows:

$$3n_1 - 4n_2 + n_3 = 0$$

In the preceding modification, the inner and outer armatures have been magnetized. However, directing attention to FIG. 11, one of the armatures may be an unmagnetized salient pole armature. Thus, the central armature 61 is made from a magnetically permeable material which is incapable of being permanently magnetized and hence has no permanent north or south poles. The outer armature 62 has two north and two south poles and resembles the preceding modification. The field structure 63 has the bars 64a to 64d arranged in a manner similar to FIG. 6. In this modification the direction of rotation is anti-gearwise and the formula for the expression of the rotation is as follows:

$$2n_1 - n_2 - n_3 = 0$$

FIG. 12 shows a further modification of the invention. Armature 66 is of the squirrel cage variety, having a plurality of electrically conducting bars 67 embedded in a central magnetically permeable rotatable member 68 and connected by annular conducting rings 69 on either side. The outer armature 71 has two north and two south poles. The field structure 72 has four bars, 73a, 73b, 73c, 73d, similar to bars 64a to 64d in FIG. 11, and likewise to the corresponding bars in FIG. 6. The squirrel cage armature will cause the drive to "slip" a certain percentage of synchronous speed, depending on the transmitted torque similar to the operation of an A.C. induction motor having a squirrel cage rotor. The inside rotor is magnetized by the magnetic paths to produce two poles. The position of the two poles is kept the same except for slip by the squirrel cage conductor arrangement similar to induction motor rotors. The arrangement shown in FIG. 12 is anti-gearwise and the formula for synchronous speed of the drive is as follows:

$$2n_1 - n_2 - n_3 = 0$$

A generalized formula for the rotational velocities of various members as determined by the sum of north and south poles in the members and wherein $N_1$ is such sum for the outer member $N_3$ for the inner member, is as follows:

$$\frac{N_1}{N_3} n_1 - \left(\frac{N_1}{N_3} + 1\right) n_2 + n_3 = 0 \text{ Gearwise}$$

$$\frac{N_1}{N_2} n_1 - \left(\frac{N_1}{N_3} - 1\right) n_2 - n_3 = 0 \text{ Antigearwise}$$

The coefficient of $n_2$ multiplied by ½ $N_3$ in the above equations indicates the number of equally spaced pole pieces for the field structure. Satisfactory irregular designs of pole pieces are also usable.

It will be further understood, although not specifically illustrated herein, that coils can be wound around any of the members where the magnetic flux varies when the drive is in operation. Voltage generated by these coils can be used to electrically power speed-signalling devices, torque-indicating devices (by measuring the leakage flux in the magnetic circuit), signal on-off operation of the drive, or to obtain finite quantities of power for driving other electrical devices.

FIG. 13 illustrates a combination of drives which share various components. Thus, there are two armatures 76, 77, each having a north and a south pole. The outer armature 78, as here illustrated, has six north and six south poles. Four field magnetically permeable bars 79a to 74d are positioned relative to rotor 76 as shown schematically in FIG. 13. Similarly, three field bars 81a, 81b, 81c, are positioned relative to armature 77. Armatures 76, 77, are driven in common from the rotation of armature 78, at a 6-to-1 ratio. Armature 76 rotates in the same direction as armature 78, whereas armature 77 rotates in the opposite direction.

FIGS. 14 and 15 illustrate still a further adaptation of the invention, which is particularly useful for high ratio drives. Outer magnet assembly 126 comprises an annular magnet 127, preferably a ceramic magnet, of the type previously identified, magnetized axially—i.e., the left end as viewed in FIG. 14 is N and the right end S. At the left end of magnet 127 is an iron ring 128, having about the same outside diameter as magnet 127 but having a plurality of inward-directed, equi-angularly spaced teeth 129 functioning as salient poles and here shown as fifteen in number, each being a salient pole with S polarity. The gaps between teeth are at least as wide as the teeth themselves. Ring 131 at the right end of magnet 127 is similarly shaped having fifteen teeth 132. As best shown in FIG. 15, teeth 129 are staggered relative to teeth 132, i.e., looking axially the poles or teeth of one ring appear centered between the poles of the other. The effect of this structure is to provide 15 N and 15 S poles on the outer magnet assembly 126.

The field structure 136 comprises equi-angularly spaced radially disposed iron bars 137 mounted in a non-magnetic annular matrix 138. Bars 137 have an axial length equal or greater than the distance between the outside surfaces of teeth 129, 132, and are shown as sixteen in number. Bars 137 have an arcuate length less than that of the inner ends of teeth 129 or 132. Bars 137 come alternately under the attraction of poles 129, 132 and hence reverse in polarity thirty times per revolution. As here shown, matrix 138 is fixed for rotation with flange 139 on shaft 141.

The inner armature 146 comprises a magnet 147, preferably ceramic, and having diametrically opposed N and S poles. Magnet 147 is mounted on a sleeve 148 fixed to shaft 149 axially aligned with shaft 141.

The drive described and illustrated is gearwise and conforms to the equation:

$$15n_1 - 16n_2 + n_3 = 0$$

In order to have efficient operation of the drive at elevated speeds, the drive must be designed to avoid eddy currents or to keep eddy currents to a tolerable minimum, depending on the economics of the particular situation.

At the beginning of the specifications, a suitable material for the armature was described, namely, barium carbonate with iron oxide incorporated therein. Other suitable magnet materials are magnetized metal particles embedded in non-conducting material, laminated magnetized metals, and the like. For magnetic but not magnetized parts, laminated magnetic metals, ferrite magnetic material (a ceramic material), magnetically permeable metal particles embedded in non-conducting material may be used. All of these can take the form of an injection-molding plastic mixture which contains as much iron powder incorporated therein as possible. At present, 80% by volume of iron powder is commercially available in a cast material. Higher concentrations are contemplated.

A practical adaption of the invention is illustrated in FIG. 16. A collar-type housing 86 is secured by flange 87 at one end to the casing of motor 88. The opposite end of collar 86 supports flange 89 of pump housing 91. Inside housing 91 is an impeller 92 mounted for rotation on shaft 93 journalled within housing 91. Pump housing 91 has an inlet 94 at its end opposite motor 88 and a discharge as indicated by 96, all as well understood in the centrifugal pump art.

A twelve-pole (i.e., six north, and six south) ring magnet armature 97 is supported in iron ring 98, which acts as a low reluctance return path to complete the magnetic circuit on the outside of the pole, within collar housing 86 and hence housing 86 is preferably of a non-magnetic material. However, if collar 86 is made of soft steel or even cast iron, ring 98 may be omitted since the housing itself will then serve the function of providing the magnetic return path.

The field structure assembly 101 comprises a hub 102 secured to motor shaft 103 by setscrew 104 and having a flange 106 riveted by means of rivets 107 or otherwise suitably secured to a cup-like plastic member 108 which extends inside armature 97 and is concentric therewith. Support member 108 is preferably of a non-magnetic material, having low-electrical conductivity to minimize eddy current losses therein, and for such purpose a plastic or Bakelite material is proper, although a moderately conductive metal, such as zinc die cast metal, or the like, may be used. For low-speed drives, the only requirement of the member 108 is that it be non-magnetic. A plurality of pole pieces 109 here shown as eight in number, are pressed or molded into support 108. Pole pieces 109 may be iron slugs, or they may be molded in place with a mixture of iron powder and a plastic or epoxy binder.

The pole pieces may be molded in place using injection-molding machines for production quantities. Suitable retention lugs 111 may be molded into pole pieces 109 to secure them against centrifugal force. The inner or sun armature 112 is mounted around hub 113 fixed to shaft 93. In the form here shown, armature 112 has two north and two south poles. A liquid-tight, cup-shaped partition 113 surrounds armature 112 and is secured at its lip by means of O-ring 114 to a recess in flange 89 or otherwise sealed with a fluid-type seal. Partition 113 must be of a non-magnetic material and preferably of low-electrical conductivity. Stainless steel of certain types may be used, or a plastic material will suffice, depending upon the conditions of service as regards temperature, pressure, nature of fluid being pumped, etc.

In use, motor 88 turns shaft 103, which in turn rotates the field 101, and more specifically the bars 109. The outer or ring gear 97 is held stationary. This results in rotation of inner armature 112 and consequent rotation of pump impeller 92. Reference to FIG. 9 will show the schematic operation of the pump of FIGS. 16 and 17, inasmuch as the armatures and field are essentially the same as schematically illustrated.

FIG. 18 shows a modification of the structure of FIG. 16. In many particulars, the parts are the same and corresponding parts have been marked with the same reference numerals. Outer magnet 97 is received in cup 116, which is connected to flange 106 by rivets 107; hence magnet 97 rotates with motor shaft 103. Magnet 112 is mounted for rotation with pump shaft 93, as in the preceding modification. The field structure 117 is stationary in this modification. Thus magnetizable radial bars 119 are imbedded or otherwise carried in a non-conductive member 118 having flange 121 connected to flange 89 of pump housing 91 by bolts 122 and sealed by gasket 114. Member 118 also has a central disk 123 which seals off shaft 93 and thus performs the same sealing function as cup 113 in FIG. 16

Rotation of motor 88 causes rotation of shaft 93. Relative direction of rotation and speed ratios are governed by principles previously described in detail.

The materials of construction in FIG. 18 are similar to the corresponding portions of FIG. 16 and the method of operation is essentially the same.

Although the foregoing invention has been described in some detail, by way of illustration and example for purposes of clarity of understanding, it is understood that certain changes and modifications may be practiced within the spirit of the invention and scope of the appended claims.

What is claimed is:

1. A magnetic planetary drive comprising an annular first member which is magnetized and has a plurality of N and S poles, an annular second member inside said first member and having a plurality of substantially radial magnetically permeable bars terminating closely adjacent said first member, and a central third member having at least one N and one S pole inside said second member, said members being rotatable relative to each other and having a common axis of revolution and having their central planes of magnetism closely adjacent a common plane, and drive means for rotating at least one said member to rotate at least one of the other said members, said second member being positioned to transmit magnetism from said first member to said third member in substantially a straight-line path.

2. The drive of claim 1 in which the angle between some of said adjacent bars is less than the angle between other of said adjacent bars.

3. A drive according to claim 1 in which said bars are disposed relative to said axis of revolution as chords when viewed in end elevation.

4. A drive according to claim 1, in which said third member is a salient pole armature.

5. A drive according to claim 1, in which said third member is a squirrel cage rotor.

6. A drive according to claim 1, in which the number of poles in said first member equals the number of poles in said third member.

7. A drive according to claim 1, in which said bars are substantially equi-angularly disposed.

8. A drive according to claim 1, wherein the drive is gearwise according to the formula:

$$\frac{N_1}{N_3}n_1 - \left(\frac{N_1}{N_3}+1\right)n_2 + n_3 = 0$$

wherein $N_1$ and $N_3$ are the sum of north and south poles in outer and inner members, respectively, and $n_1$, $n_2$, and $n_3$ are the angular velocities of the outer, intermediate and inner members, respectively.

9. A drive according to claim 1, in which the outermost of said members comprises an annular magnet magnetized axially, a first permeable ring at one end of said annular magnet having inward-directed, angularly spaced first teeth, a second permeable ring opposite said first ring having inward directed, angularly spaced second teeth, said first and second teeth angularly staggered in end elevation.

10. A drive according to claim 1, wherein the drive is antigearwise according to the formula:

$$\frac{N_1}{N_3}n_1 = \left(\frac{N_1}{N_3}-1\right)n_2 - n_3 = 0$$

wherein $N_1$ and $N_3$ are the sum of north and south poles in outer and inner members, respectively, and $n_1$, $n_2$, and $n_3$ are the angular velocities of the outer, intermediate and inner members, respectively.

11. A drive according to claim 1, in which said first member is radially magnetized and said third member is laterally magnetized.

12. A drive according to claim 1, which further comprises a fluid tight annular membrane interposed between two said members.

13. A drive according to claim 12, in which said membrane is between said first and third members and is non-rotatable relative to said member.

14. A drive according to claim 13, in which said membrane and second member are combined.

15. A drive according to claim 12, which further comprises a drive motor and a pump having a shaft and wherein said motor is coupled to said first member and said shaft is coupled to said third member and said membrane seals one end of said shaft.

16. A drive according to claim 12, which further comprises a drive motor and a pump having a shaft and wherein said motor is coupled to said second member, said first member is fixed against rotation and said shaft is coupled to said third member.

17. A magnetic drive comprising an annular first member having a plurality of N and S poles, a first and a second armature inside said first member and each having at least one N and one S pole, a plurality of first field magnetically permeable bars extending from adjacent the periphery of said first armature to adjacent the inner diameter of said first member, said first bars spaced closely together, a plurality of second field magnetically permeable bars extending from adjacent the periphery of said second armature to adjacent the inner diameter of said first member, said second bars spaced closely together, said first member and said first and second armature rotatable, and drive means for rotating said first member, said armatures driven in opposite directions by said first member.

References Cited

UNITED STATES PATENTS

| 1,171,351 | 2/1916 | Neuland | 310—103 |
| 1,724,272 | 8/1929 | Ford | 310—104 |
| 2,230,717 | 2/1941 | De Lancey | 310—104 X |
| 2,939,023 | 5/1960 | Fehr | 310—105 |

FOREIGN PATENTS

| 742,362 | 12/1943 | Germany. |

DAVID X. SLINEY, *Primary Examiner.*